(12) United States Patent
Stelcl

(10) Patent No.: US 12,161,064 B2
(45) Date of Patent: Dec. 10, 2024

(54) HARVESTING REELS AND METHODS OF CHANGING REEL TINE TRAJECTORIES

(71) Applicant: AGCO International GmbH, Neuhausen (CH)

(72) Inventor: Michael Stelcl, Breganze (IT)

(73) Assignee: AGCO International GmbH, Neuhausen (CH)

( * ) Notice: Subject to any disclaimer, the term of this patent is extended or adjusted under 35 U.S.C. 154(b) by 775 days.

(21) Appl. No.: 17/346,651

(22) Filed: Jun. 14, 2021

(65) Prior Publication Data
US 2021/0392817 A1 Dec. 23, 2021

(30) Foreign Application Priority Data

Jun. 18, 2020 (GB) ...................................... 2009285

(51) Int. Cl.
*A01D 43/00* (2006.01)
*A01D 57/03* (2006.01)
*A01D 57/04* (2006.01)

(52) U.S. Cl.
CPC ............. *A01D 57/03* (2013.01); *A01D 57/04* (2013.01)

(58) Field of Classification Search
CPC ...... A01D 57/02; A01D 57/025; A01D 57/03; A01D 57/04; A01D 57/12; A01D 34/283; A01D 41/141
See application file for complete search history.

(56) References Cited

U.S. PATENT DOCUMENTS

| | | |
|---|---|---|
| 3,599,411 A | 8/1971 | Scarnato et al. |
| 3,722,194 A | 3/1973 | Halls |
| 5,987,861 A * | 11/1999 | Duncan .................. A01D 57/03 460/142 |
| 6,170,244 B1 * | 1/2001 | Coers ..................... A01D 57/03 460/142 |
| 6,591,598 B2 | 7/2003 | Remillard et al. |
| 6,843,045 B2 | 1/2005 | Bickel |
| 9,750,189 B2 | 9/2017 | Honey et al. |
| 9,775,295 B2 | 10/2017 | Remillard |

(Continued)

FOREIGN PATENT DOCUMENTS

| | | |
|---|---|---|
| EP | 3123855 A1 | 2/2017 |
| WO | 2019/046930 A1 | 3/2019 |

OTHER PUBLICATIONS

UK Intellectual Property Office, Search Report for Priority Application No. GB2009285.4, dated Dec. 10, 2020.

(Continued)

*Primary Examiner* — Thomas B Will
*Assistant Examiner* — Robert E Pezzuto

(57) ABSTRACT

A harvesting reel includes a reel frame and a rotating assembly. The reel frame includes two cam assemblies and a cover. The first cam assembly defines a first cam track, and the second cam assembly defines a second cam track. The rotating assembly carries a plurality of reel bats configured to revolve around the longitudinal axis of the rotating assembly and a plurality of reel tines fixed to each reel bat. Each reel bat is coupled to a first cam follower and a second cam follower. The first cam follower of each reel bat travels within the first cam track, the second cam follower of each reel bat travels within the second cam track, and a position and an orientation of each reel bat are defined by the cam tracks.

18 Claims, 11 Drawing Sheets

(56) References Cited

U.S. PATENT DOCUMENTS

| | | | |
|---|---|---|---|
| 9,820,440 B2 | 11/2017 | Jost et al. | |
| 10,244,681 B2* | 4/2019 | Jost | A01D 57/03 |
| 2002/0148210 A1 | 10/2002 | Bickel | |
| 2016/0255773 A1 | 9/2016 | Rayfield et al. | |
| 2017/0311546 A1 | 11/2017 | Jost et al. | |
| 2019/0082601 A1 | 3/2019 | Honey et al. | |
| 2020/0214208 A1* | 7/2020 | Shearer | A01D 57/02 |

OTHER PUBLICATIONS

Oduori, Mbuya, Sakai, Inoue, "Kinematics of the tined combine harvester reel", Published Sep. 2012, Agric Eng Int: CIGR Journal, Open access at http://www.cigrjournal.org, vol. 14, No. 3, pp. 53-60.

European Patent Office, Search Report for related European Patent Application No. EP 21178875, dated Nov. 12, 2021.

* cited by examiner

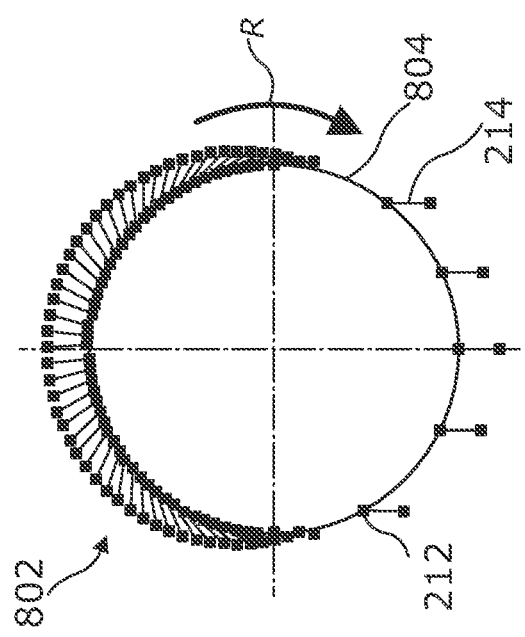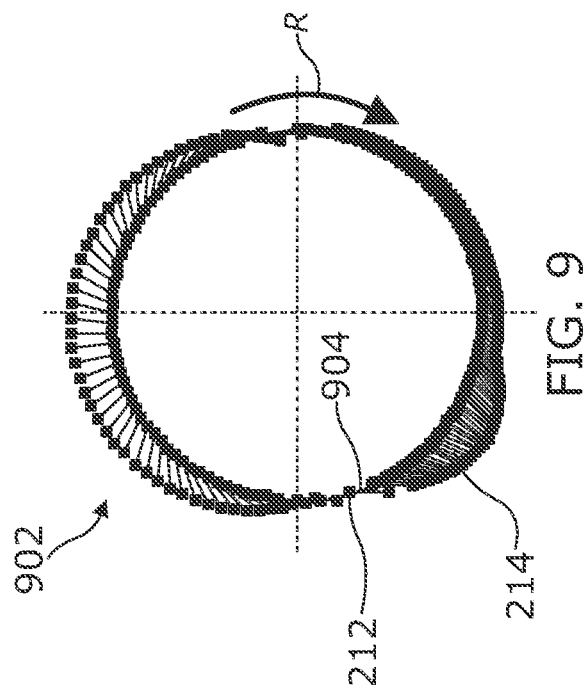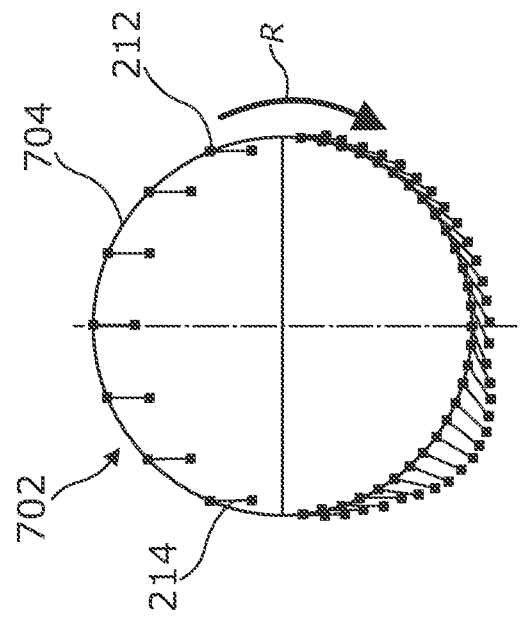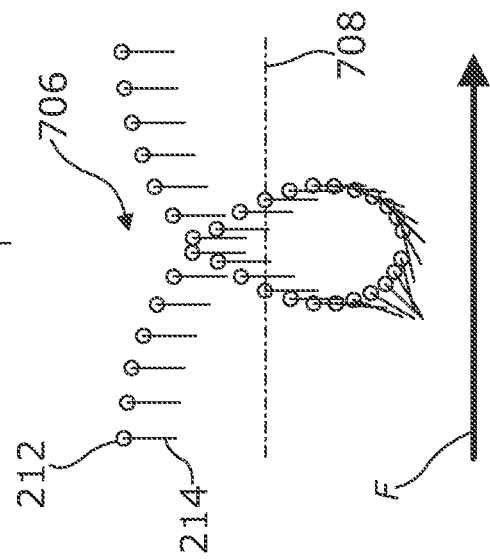
FIG. 7
FIG. 8
FIG. 9

HARVESTING REELS AND METHODS OF CHANGING REEL TINE TRAJECTORIES

CROSS-REFERENCE TO RELATED APPLICATION

This application claims the benefit of the filing date of U.K. Patent Application GB2009285.4, "Harvesting Reels and Methods of Changing Reel Tine Trajectories," filed Jun. 18, 2020, the entire disclosure of which is incorporated herein by reference.

FIELD

Embodiments of the present disclosure relate generally to machines and methods of harvesting crops. In particular, embodiments relate to methods and apparatus for controlling tines on a reel attached to a harvesting header.

BACKGROUND

Self-propelled agricultural harvesters are well known and include, by way of example, combine harvesters, windrowers, and forage harvesters, all of which typically include a frame or chassis, an operator cab, an engine, and ground-engaging wheels or tracks. A cutting or pick-up header is often carried by the harvester, the header typically being considerably wider than the harvester and mounted to the front side of a feederhouse.

Crop material collected by the header is conveyed into the feederhouse before being conveyed in a generally rearward direction to crop-processing apparatus. In the case of a combine harvester, the processing apparatus serves to thresh the crop material and separate grain therefrom, whereas, in the case of a forage harvester or windrower, the crop material is typically passed through conditioning rollers.

A harvesting reel may guide the crop material to be harvested towards a harvesting tool, such as a set of oscillating blades. Tine bars carrying axially spaced tines are mounted to the reel for pivotal movement about axes generally parallel to a rotational axis of the reel. A series of cams, mounted between a sidewall and an end of the rotary reel, in cooperation with linkages to each tine bar, control the pivotal movement of the tine bars and thus the angular orientation of the tines. As the reel rotates, the tines on each tine bar follow a path defined by the cam for lifting, separating, and guiding crop material towards the harvesting tool.

BRIEF SUMMARY

In some embodiments, a harvesting reel includes a reel frame configured to be carried by a harvesting header and a rotating assembly rotatably coupled to the reel frame and configured to rotate about a longitudinal axis. The reel frame includes a first cam assembly comprising a first inner plate and a first outer guide, a second cam assembly comprising a second inner plate and a second outer guide, and a cover coupled to the first cam assembly and the second cam assembly. The first cam assembly defines a first cam track, and the second cam assembly defines a second cam track. The rotating assembly has a plurality of reel bats configured to revolve around the longitudinal axis of the rotating assembly and a plurality of reel tines fixed to each reel bat. Each reel bat is coupled to a first cam follower and a second cam follower. The first cam follower of each reel bat travels within the first cam track when the rotating assembly rotates, the second cam follower of each reel bat travels within the second cam track when the rotating assembly rotates, and a position and an orientation of each reel bat are defined by the first cam track and the second cam track.

A method of changing a trajectory of reel tines of a harvesting reel includes removing a first cam assembly and a second cam assembly from a harvesting reel, attaching a third cam assembly and a fourth cam assembly to the harvesting reel, aligning a first cam follower of each of a plurality of reel bats of a rotating assembly within a third cam track, and aligning a second cam follower of each of the plurality of reel tines within a fourth cam track. The first cam assembly defines a first cam track, the second cam assembly defining a second cam track, the third cam assembly defines the third cam track, and the fourth cam assembly defines the fourth cam track.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

FIG. 7 illustrates a path that tines of the reel bats may travel when the reel bats are controlled by the cam tracks shown in FIG. 4;

FIG. 8 illustrates a path that tines of the reel bats may travel when the reel bats are controlled by the cam tracks shown in FIG. 5;

FIG. 9 illustrates a path that tines of the reel bats may travel when the reel bats are controlled by the cam tracks shown in FIG. 6;

DETAILED DESCRIPTION

Figure 1:
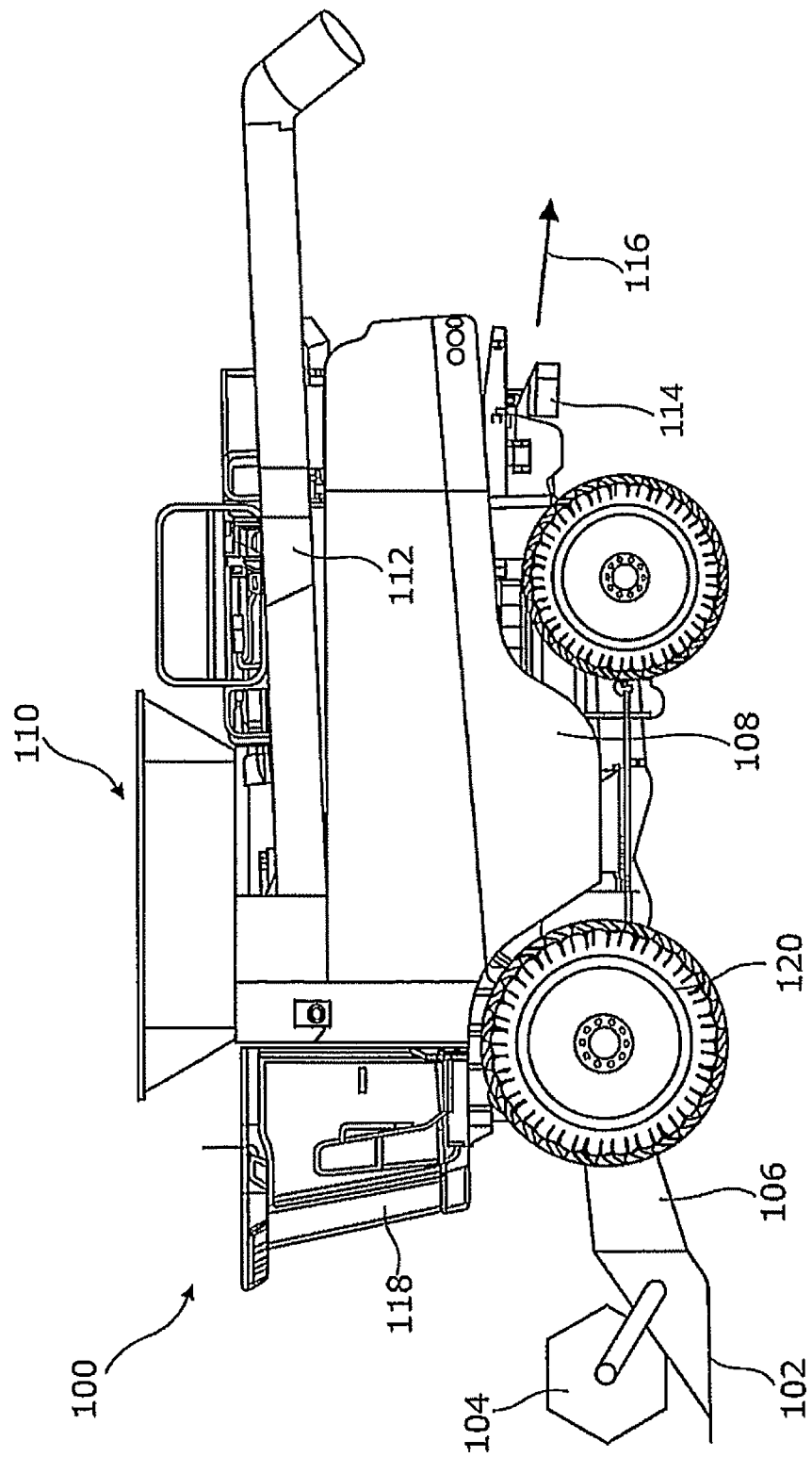
FIG. 1 is a simplified side view of a combine harvester.

The illustrations presented herein are not actual views of any harvesting machine or portion thereof, but are merely idealized representations employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an agricultural machine in the form of a self-propelled combine harvester 100 that carries a header 102, which cuts and gathers a strip of crop as the combine harvester 100 is driven across a crop field. The header 102 has a harvesting reel 104, which may be used to direct crop material into the header 102. An elevator section 106 and feederhouse of the combine harvester 100 convey the cut crop stream from the header 102 into a crop processing apparatus 108. Clean grain separated from the crop stream is collected in a storage tank 110, which is periodically emptied into a trailer or other vehicle or storage container via an unloading auger 112. Residue material remaining from the crop stream, such as straw and chaff, is ejected by a spreading system 114 from the rear of the combine harvester 100, represented by arrow 116. The combine harvester 100 also typically includes an operator cab 118, an engine, and wheels 120 and/or tracks.

Figure 2:
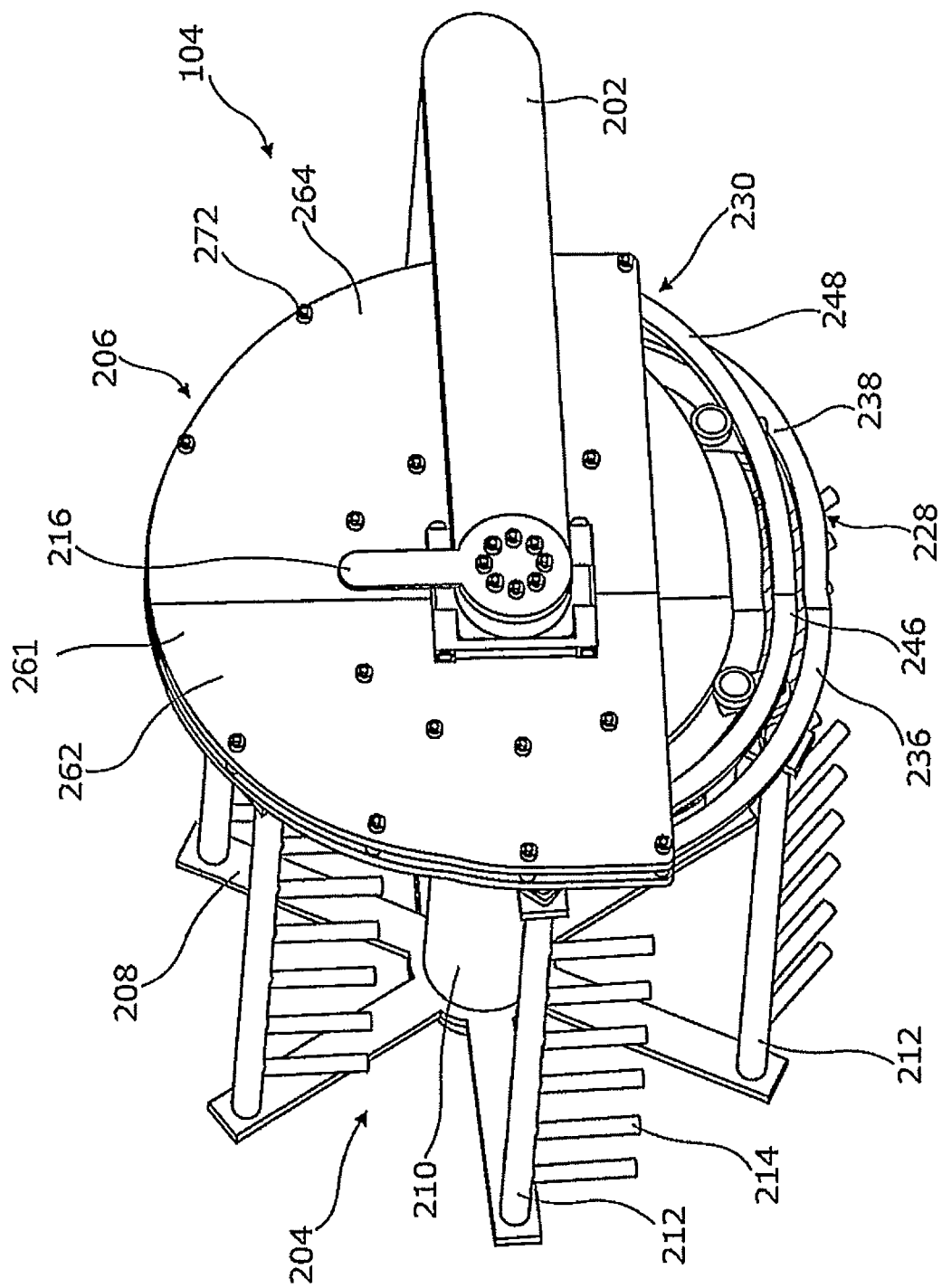
FIG. 2 is a simplified perspective view of a harvesting reel of the combine harvester of FIG. 1.

FIG. 2 is a simplified perspective view of the harvesting reel 104 separated from the header 102, and illustrates details of the harvesting reel 104. The reel 104 is connected to the header 102 by an arm 202 such that the height of the reel 104 may be changed by rotating the arm 202 relative to the header 102.

The harvesting reel 104 includes a rotating assembly 204 coupled to a reel frame 206, which is in turn coupled to the arm 202. The rotating assembly 204 includes rotating end plates 208, pictured as a solid center plate with arms extending radially outward. In some embodiments, the end plates 208 may be solid disks or any other selected geometry. A longitudinal bar 210 may connect the end plates 208 to one another. The rotating assembly 204, including the end plates 208 and the longitudinal bar 210, is configured to rotate about a generally horizontal axis as the header 102 and combine harvester 100 harvest a field. The rotating assembly 204 may be driven by mechanical, pneumatic, electrical, or other power, typically supplied by the combine harvester 100 to the header 102.

The end plates 208 together retain and carry a plurality of reel bats 212, each of which has a plurality of reel tines 214 fixed thereto. Thus, rotation of the reel bats 212 causes the reel tines 214 to revolve around the longitudinal bar 210. The reel bats 212 are configured to travel in a path around the longitudinal bar 210 when the rotating assembly 204 rotates, and may also be configured to rotate in a controlled manner by a series of cams, the mechanism for which is discussed in further detail below.

In some embodiments, the harvesting reel 104 may include a lever 216 coupled to the reel frame 206, such that rotation of the lever 216 rotates the reel frame 206. Typically, the lever 216 may be configured to rotate the reel frame 206 relative to the header 102 by an angle of ±45° from a central position, such as ±30° from the central position. Rotation of the lever 216 and reel frame 206 may be used to make the harvesting reel 104 more or less aggressive, and may be set according to field conditions and operator preferences.

Figure 3:
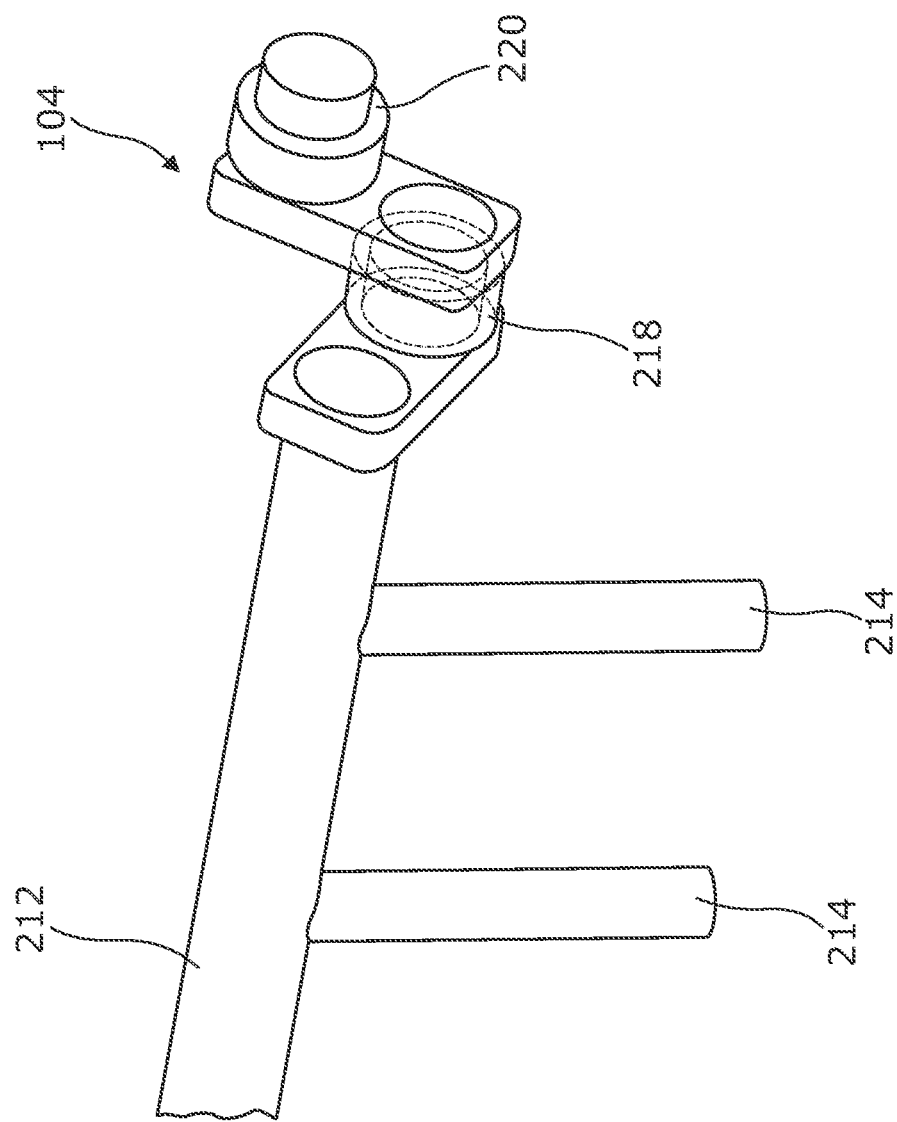
FIG. 3 is a simplified perspective view of a portion of one of the reel bats of the harvesting reel of FIG. 2.

FIG. 3 is a simplified perspective view of a portion of one of the reel bats 212. Each reel bat 212 is coupled to a first cam follower 218 and a second cam follower 220 offset from the longitudinal axis of the reel bat 212. The cam followers 218, 220 follow cam tracks defined by the reel frame 206 and described in further detail below. The cam followers 218, 220 are each rigidly coupled to the reel bats 212. As the end plates 208 rotate, the reel bats 212 revolve around the longitudinal bar 210. At the same time, the cam followers 218, 220, in conjunction with cam tracks described below, determine the location and orientation of the reel bats 212 (and thus, of the tines 214 affixed thereto). The cam followers 218, 220 may include roller bearings or another mechanism to enable smooth movement of the reel bats 212.

Figure 6:
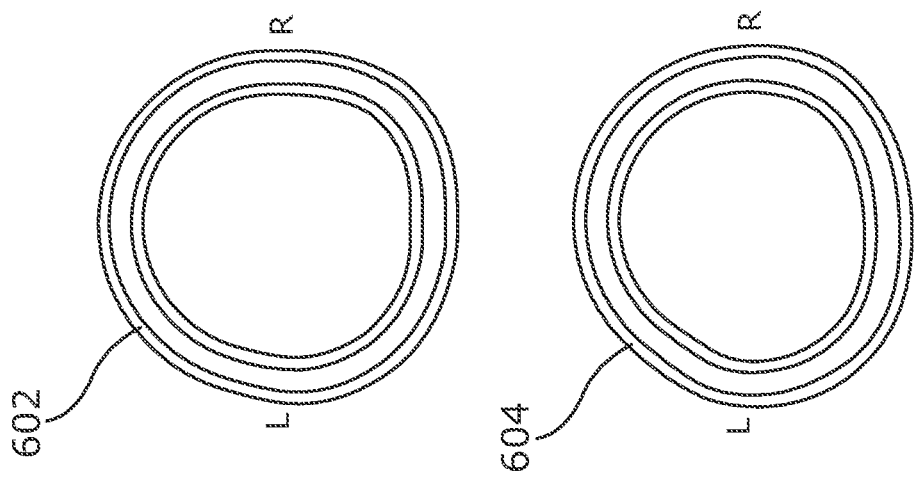
FIG. 6 illustrates yet another pair of cam tracks that may be used to control motion of the reel bats of FIG. 3.
Figure 5:
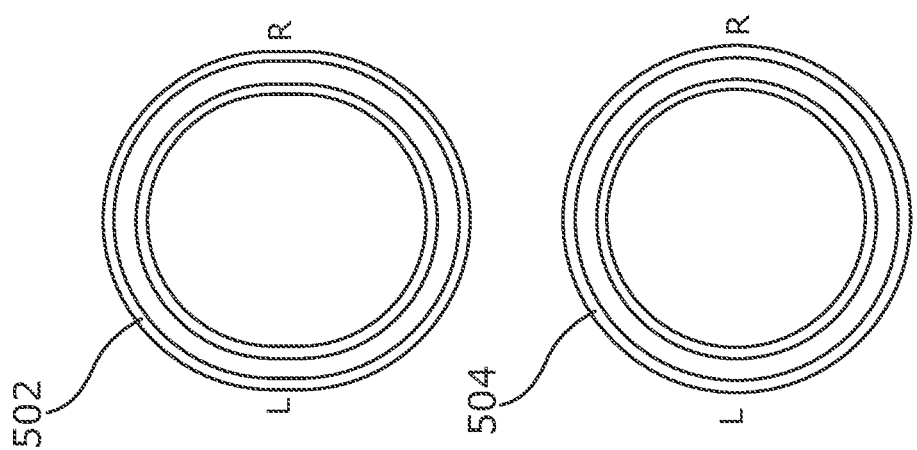
FIG. 5 illustrates another pair of cam tracks that may be used to control motion of the reel bats of FIG. 3.
Figure 4:
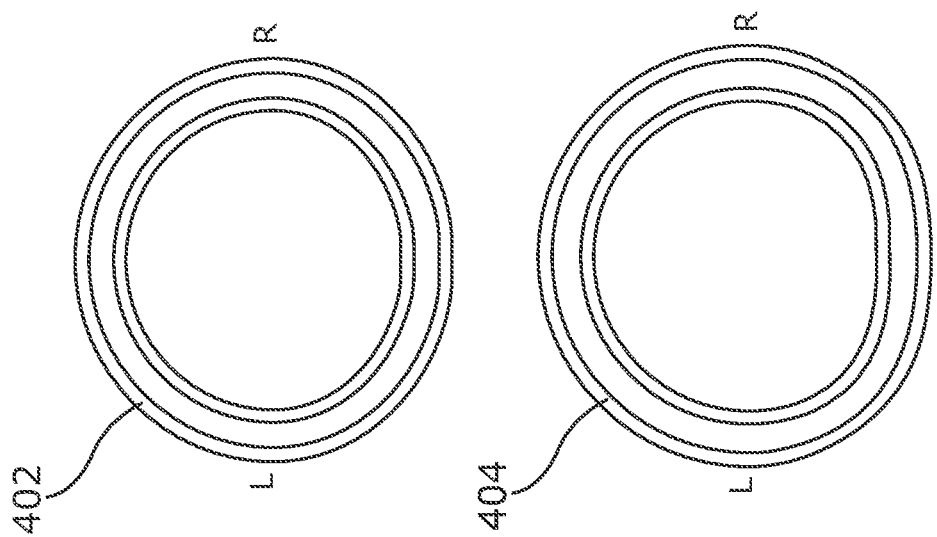
FIG. 4 illustrates a pair of cam tracks that may be used to control motion of the reel bats of FIG. 3.

FIGS. 4-6 illustrate cam tracks in which the cam followers 218, 220 may travel. In FIG. 4, the top track 402 may direct the first cam follower 218, and the bottom track 404 may direct the second cam follower 220. The tracks 402, 404 may be located adjacent one another in the reel frame 206, but are shown separated here for illustration of their different shapes. The tracks 402, 404 look similar, but have different geometries at the bottom of the tracks 402, 404. FIG. 5 illustrates another set of tracks 502, 504 that may be used to direct the cam followers 218, 220, respectively. The different shapes of the tracks 502, 504 from the tracks 402, 404 cause the tines 214 to travel in different paths around the longitudinal bar 210 of the harvesting reel 104. FIG. 6 illustrates yet another set of tracks 602, 604 that may be used to direct the cam followers 218, 220, respectively. The tracks 402, 404, 502, 504, 602, 604 may be selected to cause a particular path of the tines 214 when the harvesting reel 104 is used to harvest a crop.

FIG. 7 illustrates a path 702 that the tines 214 may travel as the rotating assembly 204 rotates in the direction R using the cam tracks 402, 404 shown in FIG. 4. The positions and orientations of the tines 214 are represented by line segments, and the curved path 704 represents the position of the reel bat 212, assuming a stationary header 102. The bottom path 706 in FIG. 7 represents the actual position of the tines 214 and the reel bat 212 relative to a stationary observer as the header 102 moves in a forward direction F. The line 708 represents the path of the longitudinal bar 210 of the rotating assembly 204 (i.e., the longitudinal bar 210 travels parallel to the ground), and may also be at or near the top of the crop material. As shown in FIG. 7, the tines travel vertically straight downward into the crop material, then angle rearward. The tines 214 may therefore push the crop material rearward into the cutting assembly of the header 102. The path 706 shown was described in Oduori, Moses F., et al., "Kinematics of the tined combine harvester reel," Agric. Eng. Int.: CIGR Journal, Vol. 14, No. 3, pp. 53-60, September, 2012. The path 706 may improve the ability of the harvesting reel 104 to gather certain crops toward the header 102, and may improve the yield of those crops.

However, the path 706 may not be ideal for all crop types. For example, to break up viny crops or viny weeds within crops, it may be desirable that the tines 214 make a complete rotation or "flip over," in addition to revolving around the longitudinal bar 210. Such a flip may help to break vines so that vines do not wrap around the harvesting reel 104. A flip-over tine path is described in, for example, U.S. Pat. No. 9,820,440, "Dual Cam Controlled Reel Tines," issued Nov. 21, 2017; and U.S. Pat. No. 6,843,045, "Harvester Pickup Reel Controlling the Tine Tip Path," issued Jan. 18, 2005.

FIG. 8 illustrates a path 802 that the tines 214 may travel as the rotating assembly 204 rotates in the direction R using the cam tracks 502, 504 shown in FIG. 5. The curved path 804 represents the position of the reel bat 212, assuming a stationary header 102. As shown in FIG. 8, the tines 214 enter the crop material (i.e., the bottom half of the path 802) in an orientation that is approximately vertical. As the tines 214 travel above the longitudinal bar 210, they flip over, and thus each tine 214 makes one entire 360° rotation with each revolution around the longitudinal bar 210.

FIG. 9 illustrates a path 902 that the tines 214 may travel as the rotating assembly 204 rotates in the direction R using the cam tracks 602, 604 shown in FIG. 6. The curved path 904 represents the position of the reel bat 212, assuming a stationary header 102. As shown in FIG. 9, the tines 214 enter the crop material (i.e., the bottom half of the path 902) in an orientation that is approximately vertical. The tines 214 then angle rearward to push crop material into the header 102. As the tines 214 travel above the longitudinal bar 210, they flip over, and thus each tine 214 makes one entire 360° rotation with each revolution around the longitudinal bar 210. The path 902 combines features of the path 702 (FIG. 7) and the path 802 (FIG. 8).

Figures 10, 11, 12:
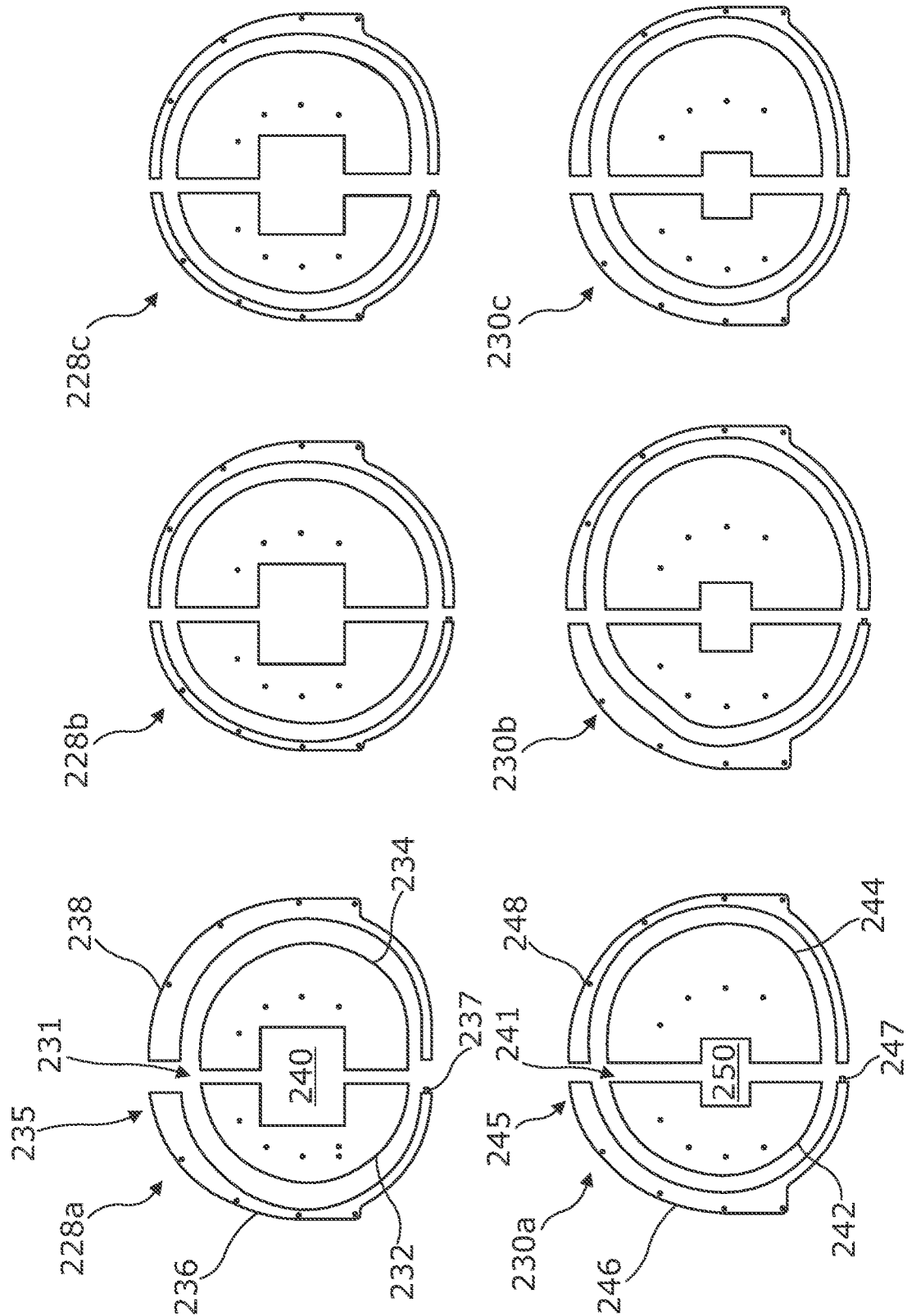
FIG. 10 illustrates cam assemblies that may be used to define the cam tracks shown in FIG. 4.
FIG. 11 illustrates cam assemblies that may be used to define the cam tracks shown in FIG. 5.
FIG. 12 illustrates cam assemblies that may be used to define the cam tracks shown in FIG. 6.

Referring again to FIG. 2, the reel frame 206 may include a first cam assembly 228 and a second cam assembly 230 defining the cam tracks 402, 404 in FIG. 4, the cam tracks 502, 504 in FIG. 5, or the cam tracks 602, 604 in FIG. 6. FIGS. 10-12 illustrate parts for three different first cam assemblies 228a, 228b, 228c (corresponding to the first cam assembly 228 in FIG. 2) and three different second cam assemblies 230a, 230b, 230c (corresponding to the second cam assembly 230 in FIG. 2). The cam assembly 228a (FIG. 10) defines the cam track 402 in FIG. 4, and the cam assembly 230a defines the cam track 404. The cam assembly 228b (FIG. 11) defines the cam track 502 in FIG. 5, and the cam assembly 230b defines the cam track 504. The cam assembly 228c (FIG. 12) defines the cam track 602 in FIG. 6, and the cam assembly 230c defines the cam track 604. The first cam assemblies 228a, 228b, 228c are interchangeable (in the sense that any one could be installed as part of the reel frame 206), as are the second cam assemblies 230a, 230b, 230c. Each is referred to hereafter as simply cam assembly 228 or cam assembly 230 for simplicity, and the parts thereof are likewise referred to without their corresponding letter suffixes.

The first cam assembly 228 includes an inner plate 231, which may have a left inner plate 232 and a right inner plate 234 (see FIG. 10). In other embodiments, the inner plate 231 may be a single unitary member. The first cam assembly 228 also includes an outer guide 235, which may likewise have a left outer guide 236 and a right outer guide 238. A pin 237 may help align the bottom of the left outer guide 236 with the bottom of the right outer guide 238. Together, the parts of the first cam assembly 228 define a first cam track in which the first cam follower 218 of each reel bat 212 travels as the rotating assembly 204 rotates. The inner plate 231 may define a non-round opening 240 to assist in aligning the inner plate 231 on the reel frame 206. The inner plate 231 and outer guide 235 may each have holes therein to secure the parts to the reel frame 206. The parts of the inner plate 231 and outer guide 235 may all be coplanar. Note that in FIGS. 10-12, a space appears between the left inner plate 232 and the right inner plate 234, and between the left outer guide 236 and the right outer guide 238, to illustrate the shape of the parts. When installed on the reel frame 206, the left inner plate 232 is adjacent the right inner plate 234, and the left outer guide 236 is adjacent the right outer guide 238.

The second cam assembly 230 also includes an inner plate 241, which may have a left inner plate 242 and a right inner plate 244. In other embodiments, the inner plate 241 may be a single unitary member. The second cam assembly 230 includes an outer guide 245, which may likewise have a left outer guide 246 and a right outer guide 248. A pin 247 may help align the bottom of the left outer guide 246 with the bottom of the right outer guide 248. Together, the parts of the second cam assembly 230 define a second cam track in which the second cam follower 220 of each reel bat 212 travels as the rotating assembly 204 rotates. The inner plate 241 may define a non-round opening 250 to assist in aligning the inner plate 241 on the reel frame 206. The inner plate 241 and outer guide 245 may each have holes therein to secure the parts to the first cam assembly 228 and the reel frame 206. The holes in the inner plate 241 and outer guide 245 of each cam assembly 228, 230 may be configured to be aligned with one another. The parts of the inner plate 241 and outer guide 245 may all be coplanar. Note that in FIGS. 10-12, a space appears between the left inner plate 242 and the right inner plate 244, and between the left outer guide 246 and the right outer guide 248, to illustrate the shape of the parts. When installed on the reel frame 206, the left inner plate 242 is adjacent the right inner plate 244, and the left outer guide 246 is adjacent the right outer guide 248.

The first cam assemblies 228a, 228b, 228c may each have holes and the non-round opening 240 in common, and the second cam assemblies 230a, 230b, 230c may each have holes and the non-round opening 250 in common. That is, the first cam assemblies 228a, 228b, 228c may each fit interchangeably on the reel frame 206, and the second cam assemblies 230a, 230b, 230c may each fit interchangeably on the reel frame 206. Replacing one first cam assembly 228a, 228b, 228c with another and one second cam assembly 230a, 230b, 230c with another changes the shape and location of the cam tracks, but does not change the structure or connection of the reel frame 206. A position and an orientation of each reel bat 212 are defined by the first cam track 402, 502, 602 and the second cam track 404, 504, 604. Thus, each set of first cam assemblies 228a, 228b, 228c and second cam assemblies 230a, 230b, 230c define different corresponding tine paths 702, 802, 902 and bat paths 704, 804, 904 (FIGS. 7-9), respectively. Changing from one tine path to another may be performed by changing the first cam assembly 228 and second cam assembly 230.

Figure 13:
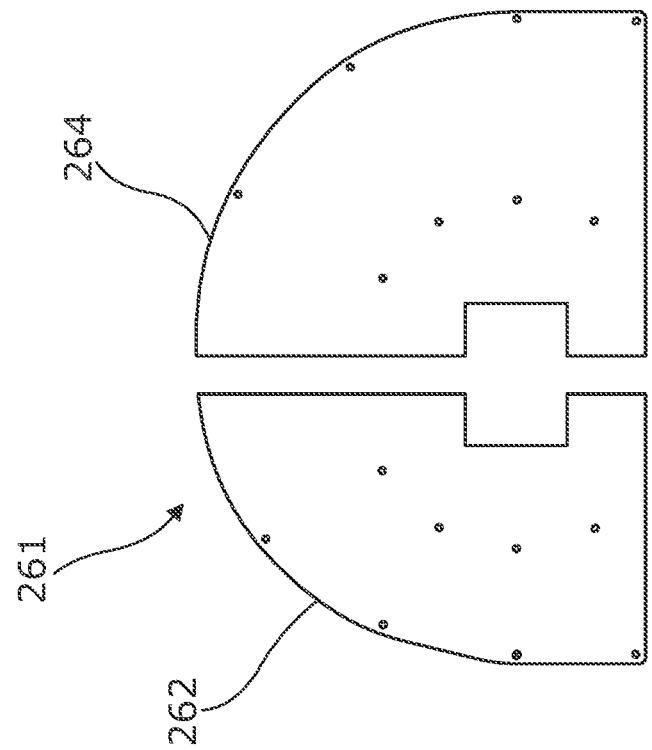
FIG. 13 illustrates a cover that may secure and protect the cam assemblies shown in FIGS. 10-12.

Referring again to FIG. 2, the frame 206 may include a cover 261 over the first cam assembly 228 and second cam assembly 230, which may help secure the frame 206 together. The cover 261 may include two or more parts, such as a left cover 262 and a right cover 264. In other embodiments, the cover 261 may be a single unitary part. FIG. 13 shows the left cover 262 and the right cover 264 alone. Each of the left cover 262 and the right cover 264 have holes configured to align with the holes in the first cam assembly 228 and second cam assembly 230. Bolts or other fasteners (FIG. 2) secure the cover 261, first cam assembly, and second cam assembly together to form the reel frame 206.

Typically, the first cam assembly 228 and the second cam assembly 230 may be attached to a single end of the reel frame 206 (i.e., near one end of the longitudinal bar 210 of the rotating assembly 204). In other embodiments, the first cam assembly 228 may be secured to the reel frame 206 at one end, and the second cam assembly 230 may be secured to the opposite end.

Figure 14:
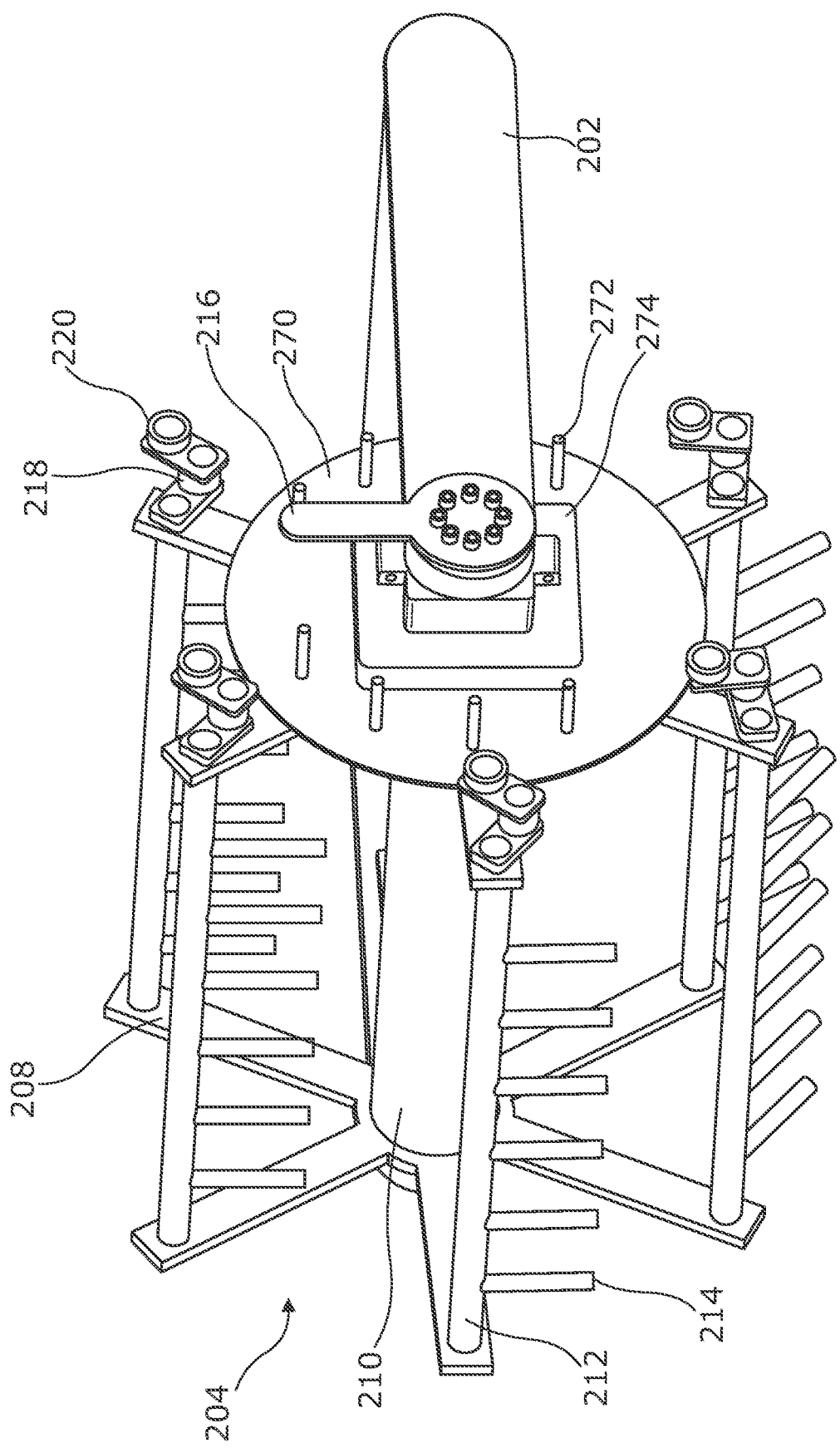
FIG. 14 illustrates the harvesting reel of FIG. 2 before the reel frame has been fully assembled.

FIGS. 14-18 and FIG. 2 illustrate how the harvesting reel 104 is assembled, and how the first cam assembly 228 and the second cam assembly 230 may be changed to change the tine trajectory. FIG. 14 illustrates the harvesting reel 104 before the reel frame 206 is fully assembled. In particular, the first cam assembly 228, the second cam assembly 230, and the cover 261 are absent from FIG. 14. The reel frame 206 includes a back plate 270 to which fasteners 272 and an alignment jig 274 are attached. The fasteners 272 may include screws and nuts, and optionally, spacers. The alignment jig 274 may be sized to receive the non-round openings 240, 250 of the cam assemblies 228, 230 (FIGS. 10-12) and the cover 261 (FIG. 13).

Figure 15:
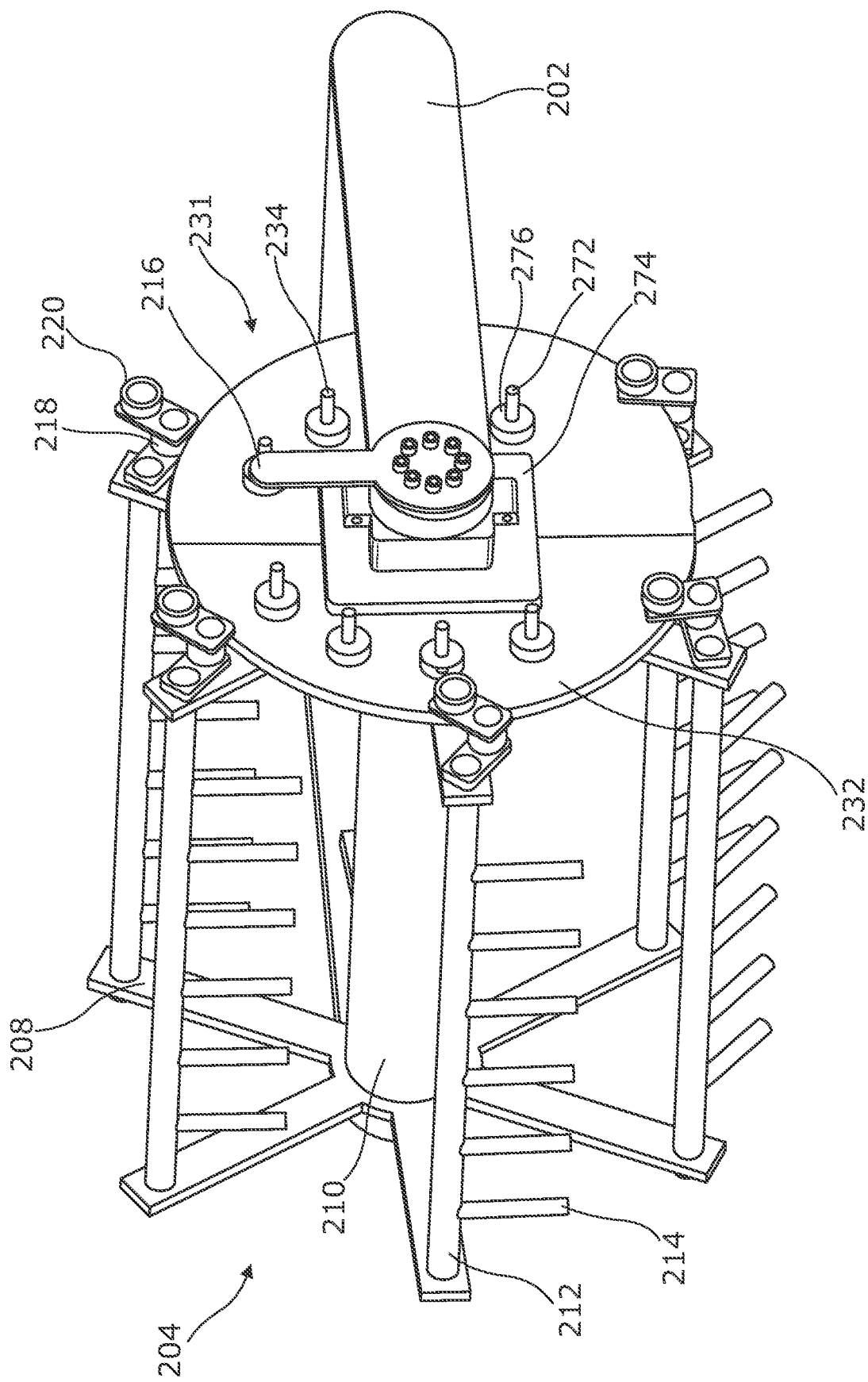
FIG. 15 illustrates the harvesting reel of FIG. 14 after a first inner plate has been installed.
Figure 16:
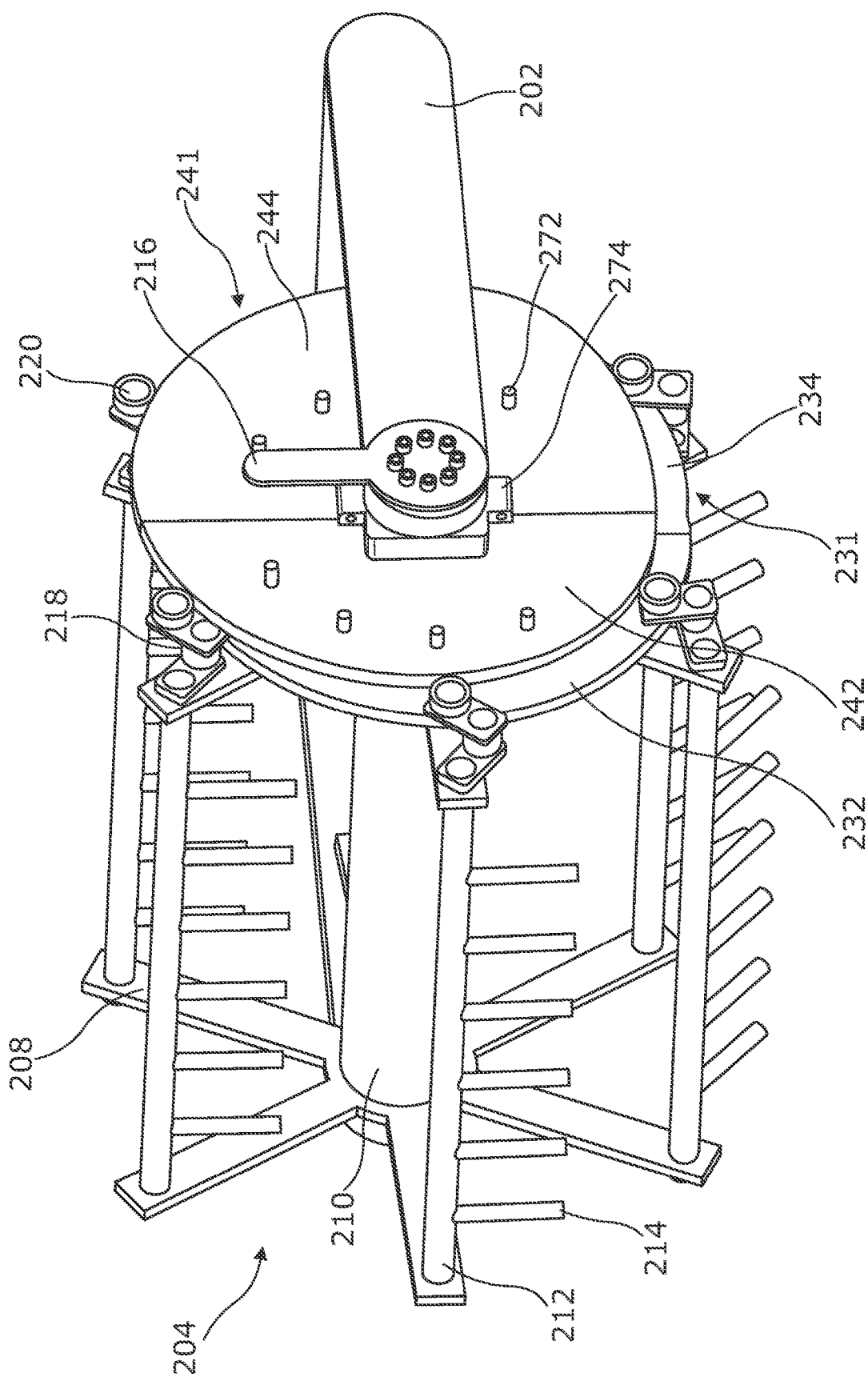
FIG. 16 illustrates the harvesting reel of FIG. 15 after a second inner plate has been installed on the first inner plate.

FIG. 15 illustrates the harvesting reel 104 after the inner plate 231 of the first cam assembly 228 (i.e., the left inner plate 232 and the right inner plate 234) has been installed on the back plate 270. Spacers 276 may be installed around the fasteners 272. FIG. 16 illustrates the harvesting reel 104 after the inner plate 241 of the second cam assembly 230 (i.e., the left inner plate 242 and the right inner plate 244) has been installed on the first cam assembly 228. The cam followers 218 of the rotating assembly 204 may be positioned adjacent the outside edges of the inner plates 231, 241 of the cam assemblies 228, 230.

Figure 17:
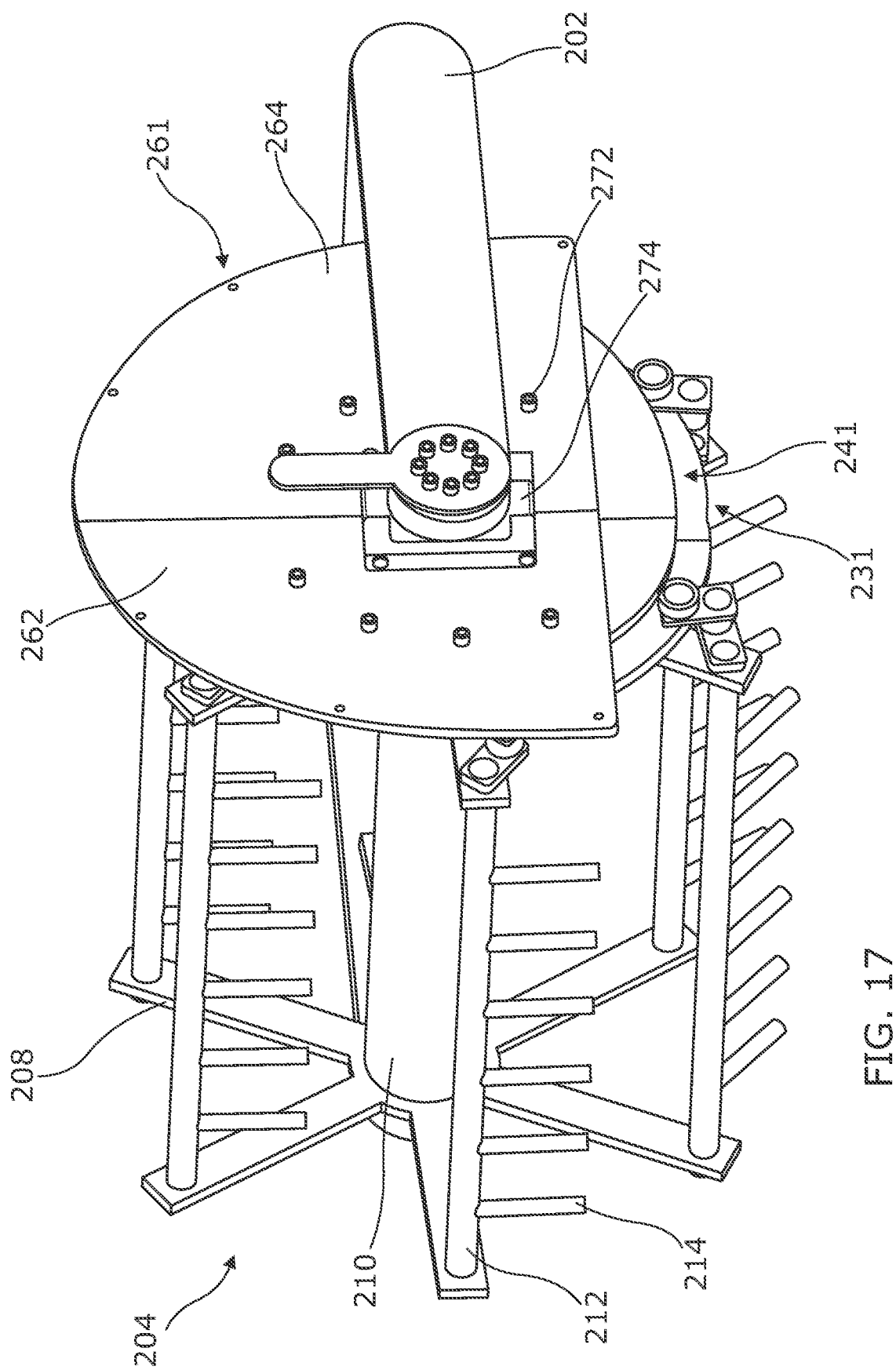
FIG. 17 illustrates the harvesting reel of FIG. 16 after a cover has been installed on the inner plates.

FIG. 17 illustrates the harvesting reel 104 after the cover 261 (i.e., the left cover 262 and the right cover 264) has been installed on the inner plate 241 of the second cam assembly 230. The fasteners 272 may then be secured to the cover 261 (e.g., if the fasteners 272 include machine screws, nuts may be screwed onto the threads thereof).

Figure 18:
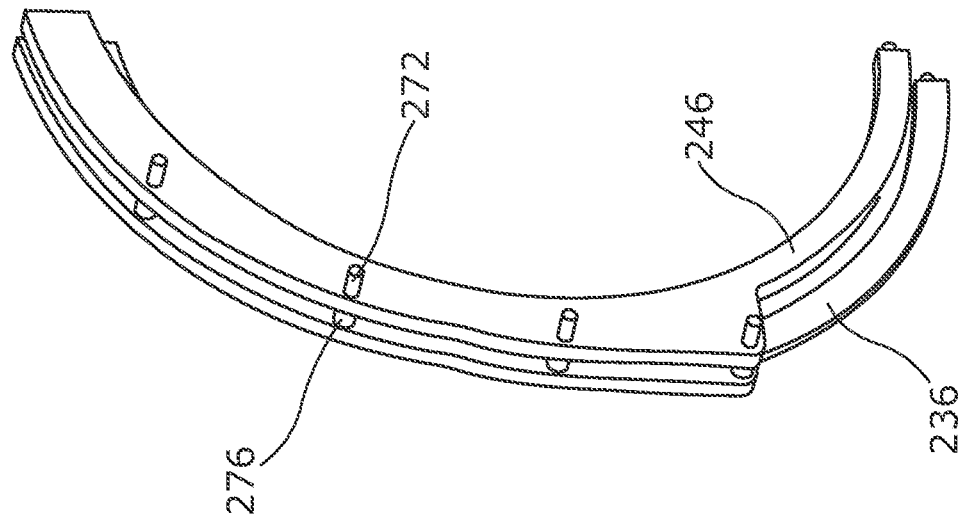
FIG. 18 illustrates how outer guides of the harvesting reel of FIG. 17 are assembled.

FIG. 18 illustrates assembly of the outer guides. The left outer guide 236 of the first cam assembly 228 may be secured to the left outer guide 246 of the second cam assembly 230 by appropriate fasteners 272 and spacers 276 (which may be the same or different than those shown in FIGS. 14-17). The right outer guides 238, 248 may be assembled together in a similar manner. The outer guides 236, 246, 238, 248 may then be secured to the cover 261 with the fasteners 272, as illustrated in FIG. 2. The cam followers 218 may be positioned between the outside edges of the inner plates 231, 241 and the inside edges of the outer guides 235, 245 of the cam assemblies 228, 230

Thus, to change from one reel tine trajectory to another, the outer guides 235, 245 may be removed, followed by the cover 261. The inner plates 241, 231 may then be removed. The inner plates 241, 231 may be replaced with ones having a different shape (but with holes for the fasteners 272 in the same locations). The cover 261 may be replaced. Then outer guides 235, 245 with a different shape matching the new inner plates 241, 231 may be installed.

Additional non limiting example embodiments of the disclosure are described below.

Embodiment 1: A harvesting reel comprising a reel frame configured to be carried by a harvesting header, and a rotating assembly rotatably coupled to the reel frame and configured to rotate about a longitudinal axis. The reel frame comprises a first cam assembly comprising a first inner plate and a first outer guide, a second cam assembly comprising a second inner plate and a second outer guide, and a cover coupled to the first cam assembly and the second cam assembly. The first cam assembly defines a first cam track, and the second cam assembly defines a second cam track. The rotating assembly comprises a plurality of reel bats configured to revolve around the longitudinal axis of the rotating assembly, wherein each reel bat is coupled to a first cam follower and a second cam follower; and a plurality of reel tines fixed to each reel bat. The first cam follower of each reel bat travels within the first cam track when the rotating assembly rotates, the second cam follower of each reel bat travels within the second cam track when the rotating assembly rotates, and a position and an orientation of each reel bat are defined by the first cam track and the second cam track.

Embodiment 2: The harvesting reel of Embodiment 1, wherein the rotating assembly comprises a longitudinal bar along the longitudinal axis.

Embodiment 3: The harvesting reel of Embodiment 1 or Embodiment 2, wherein the rotating assembly comprises a plurality of rotating end plates, wherein the end plates are configured to retain the reel bats.

Embodiment 4: The harvesting reel of any one of Embodiment 1 through Embodiment 3, wherein the first inner plate comprises at least two coplanar portions; the second inner plate comprises at least two coplanar portions; the first outer guide comprises at least two coplanar portions; and the second outer guide comprises at least two coplanar portions.

Embodiment 5: The harvesting reel of any one of Embodiment 1 through Embodiment 4, wherein the first cam assembly and the second cam assembly are attached at a same end of the reel frame.

Embodiment 6: The harvesting reel of any one of Embodiment 1 through Embodiment 4, wherein the first cam assembly and the second cam assembly are attached at opposite ends of the reel frame.

Embodiment 7: The harvesting reel of any one of Embodiment 1 through Embodiment 6, further comprising a lever coupled to the reel frame, wherein rotation of the lever causes tilting of the reel frame relative to a harvesting header carrying the reel frame.

Embodiment 8: The harvesting reel of any one of Embodiment 1 through Embodiment 7, wherein the first cam follower of each reel bat and the second cam follower of the reel bat are rigidly coupled to the reel bat.

Embodiment 9: The harvesting reel of any one of Embodiment 1 through Embodiment 8, wherein the first cam follower and the second cam follower each comprise roller bearings.

Embodiment 10: The harvesting reel of any one of Embodiment 1 through Embodiment 9, further comprising a plurality of spacers between the first inner plate and the second inner plate.

Embodiment 11: A method of changing a trajectory of reel tines of a harvesting reel, the method comprising removing a first cam assembly and a second cam assembly from a harvesting reel, attaching a third cam assembly and a fourth cam assembly to the harvesting reel, aligning a first cam follower of each of a plurality of reel bats of a rotating assembly within a third cam track; and aligning a second cam follower of each of the plurality of reel tines within a fourth cam track. The first cam assembly defines a first cam track, the second cam assembly defines a second cam track, the third cam assembly defines a third cam track, and the fourth cam assembly defines a fourth cam track.

Embodiment 12: The method of Embodiment 11, wherein the third cam track defines a different path than the first cam track, and wherein the fourth cam track defines a different path than the second cam track.

Embodiment 13: The method of Embodiment 11 or Embodiment 12, further comprising removing a cover from a reel frame of the harvesting reel.

Embodiment 14: The method of Embodiment 13, wherein removing a first cam assembly and a second cam assembly from the harvesting header comprises removing first and second outer guides from the cover.

Embodiment 15: The method of Embodiment 13 or Embodiment 14, wherein removing a cover from a reel frame of a harvesting header comprises removing the cover from an inner plate of the second cam assembly.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventor. Further, embodiments of the disclosure have utility with different and various crop-harvesting machine types and configurations.

What is claimed is:

1. A harvesting reel, comprising:
a reel frame configured to be carried by a harvesting header, the reel frame comprising:
a first cam assembly comprising a first inner plate and a first outer guide, the first cam assembly defining a first cam track;
a second cam assembly comprising a second inner plate and a second outer guide, the second cam assembly defining a second cam track;
a plurality of spacers between the first inner plate and the second inner plate; and
a cover coupled to the first cam assembly and the second cam assembly; and
a rotating assembly rotatably coupled to the reel frame and configured to rotate about a longitudinal axis, the rotating assembly comprising:
a plurality of reel bats configured to revolve around the longitudinal axis of the rotating assembly, wherein each reel bat is coupled to a first cam follower and a second cam follower; and
a plurality of reel tines fixed to each reel bat;
wherein the first cam follower of each reel bat travels within the first cam track when the rotating assembly rotates, wherein the second cam follower of each reel bat travels within the second cam track when the rotating assembly rotates, and wherein a position and an orientation of each reel bat are defined by the first cam track and the second cam track.

2. The harvesting reel of claim 1, wherein the rotating assembly comprises a longitudinal bar along the longitudinal axis.

3. The harvesting reel of claim 1, wherein the rotating assembly comprises a plurality of rotating end plates, wherein the end plates are configured to retain the reel bats.

4. The harvesting reel of claim 1, wherein the first cam follower and the second cam follower each comprise roller bearings.

5. The harvesting reel of claim 1, wherein the first cam assembly and the second cam assembly are attached at a same end of the reel frame.

6. The harvesting reel of claim 1, wherein the first cam assembly and the second cam assembly are attached at opposite ends of the reel frame.

7. The harvesting reel of claim 1, further comprising a lever coupled to the reel frame, wherein rotation of the lever causes tilting of the reel frame relative to the harvesting header carrying the reel frame.

8. The harvesting reel of claim 1, wherein the first cam follower of each reel bat and the second cam follower of the reel bat are rigidly coupled to the reel bat.

9. A harvesting reel, comprising:
a reel frame configured to be carried by a harvesting header, the reel frame comprising:
a first cam assembly comprising a first inner plate and a first outer guide, the first cam assembly defining a first cam track;

a second cam assembly comprising a second inner plate and a second outer guide, the second cam assembly defining a second cam track; and a cover coupled to the first cam assembly and the second cam assembly; and a rotating assembly rotatably coupled to the reel frame and configured to rotate about a longitudinal axis, the rotating assembly comprising:

a plurality of reel bats configured to revolve around the longitudinal axis of the rotating assembly, wherein each reel bat is coupled to a first cam follower and a second cam follower; and a plurality of reel tines fixed to each reel bat;

wherein:
- the first cam follower of each reel bat travels within the first cam track when the rotating assembly rotates, wherein the second cam follower of each reel bat travels within the second cam track when the rotating assembly rotates, and wherein a position and an orientation of each reel bat are defined by the first cam track and the second cam track;
- the first inner plate comprises at least two coplanar portions;
- the second inner plate comprises at least two coplanar portions;
- the first outer guide comprises at least two coplanar portions; and
- the second outer guide comprises at least two coplanar portions.

10. The harvesting reel of claim 9, wherein the rotating assembly comprises a longitudinal bar along the longitudinal axis.

11. The harvesting reel of claim 9, wherein the rotating assembly comprises a plurality of rotating end plates, wherein the end plates are configured to retain the reel bats.

12. The harvesting reel of claim 9, further comprising a lever coupled to the reel frame, wherein rotation of the lever causes tilting of the reel frame relative to the harvesting header carrying the reel frame.

13. The harvesting reel of claim 9, wherein the first cam follower of each reel bat and the second cam follower of the reel bat are rigidly coupled to the reel bat.

14. The harvesting reel of claim 9, wherein the first cam follower and the second cam follower each comprise roller bearings.

15. The harvesting reel of claim 9, further comprising a plurality of spacers between the first inner plate and the second inner plate.

16. A method of changing a trajectory of reel tines of a harvesting reel, the method comprising:

removing a cover from a reel frame of the harvesting reel;

removing a first cam assembly and a second cam assembly from the harvesting reel, the first cam assembly defining a first cam track and the second cam assembly defining a second cam track;

attaching a third cam assembly and a fourth cam assembly to the harvesting reel, the third cam assembly defining a third cam track and the fourth cam assembly defining a fourth cam track, wherein the third cam track defines a different path than the first cam track, and wherein the fourth cam track defines a different path than the second cam track;

aligning a first cam follower of each of a plurality of reel bats of a rotating assembly within the third cam track; and aligning a second cam follower of each of the plurality of reel tines within the fourth cam track.

17. The method of claim 16, wherein removing the first cam assembly and the second cam assembly from the harvesting reel comprises removing first and second outer guides from the cover.

18. The method of claim 16, wherein removing the cover comprises removing the cover from an inner plate of the second cam assembly.

* * * * *